Sept. 25, 1962 E. R. PRICE 3,055,720
PISTON SEAL CONSTRUCTION
Filed June 29, 1959

INVENTOR.
EARL R. PRICE
BY
William P. Hickey
ATTORNEY

United States Patent Office 3,055,720
Patented Sept. 25, 1962

3,055,720
PISTON SEAL CONSTRUCTION
Earl R. Price, South Bend, Ind., assignor to The Bendix Corporation, a corporation of Delaware
Filed June 29, 1959, Ser. No. 823,506
4 Claims. (Cl. 309—51)

The present invention relates, as indicated, to a type of piston seal construction; and more particularly to a molded construction capable of use in nonlubricating service.

It has long been known that elastomer compounds, such as the natural and synthetic rubbers, when rubbed against metal surfaces without the aid of a lubricant soon deteriorate due to the rubbing action which tears and abrades the elastomeric material. It has further been known that inexpensive seals could be made for the pistons of fluid pressure motors by directly bonding an elastomeric sealing structure to the periphery of a rigid piston body. One such structure was shown and taught in the Douglas Patent No. 2,386,668—which patent was taken out by the assignee of the present invention as a result of a development program for making more inexpensive piston assemblies. The type of structure shown in the Douglas patent was never used commercially in air motors of the type manufactured by the assignee in its power brake structures for automobiles, because they could not be made to provide the service life that conventional leather seals had given. While the men skilled in the art who have dealt with this problem have realized that the failure of the sealing structures to give adequate service life has been a result of poor lubrication, no inexpensive means of continuously providing lubricant on the seal was arrived at until the present invention—so that the assignee has continued to use the conventional more easily lubricated leather seals.

The principle object of the present invention is the provision of a new and improved air motor having a molded piston sealing structure which will not only provide adequate lubrication for the seal, but one in which the lubricating facilities will preferably be carried by the seal itself and will be inexpensive to manufacture.

The invention resides in certain constructions, combinations, and arrangements of parts; and further objects and advantages will become apparent to those skilled in the art to which the invention relates from the following description of the preferred embodiment described with reference to the accompanying drawings forming a part of this specification, and in which.

While the piston sealing structure of the present invention may be otherwise embodied, it is herein shown and described as attached to the periphery of a flat plate of the type generally shown in the Douglas Patent No. 2,386,-668; and in the preferred embodiment, the sealing structure is bonded or vulcanized to the periphery of the piston body. Synthetic rubber, such as neoprene, has been used for the seals inasmuch as synthetic rubbers are compatible with the mineral lubricants; and where vegetable lubricants are to be used, suitable results may be had with the natural rubbers. In some applications still other types of elastomeric compounds will have their uses.

Figure 1:
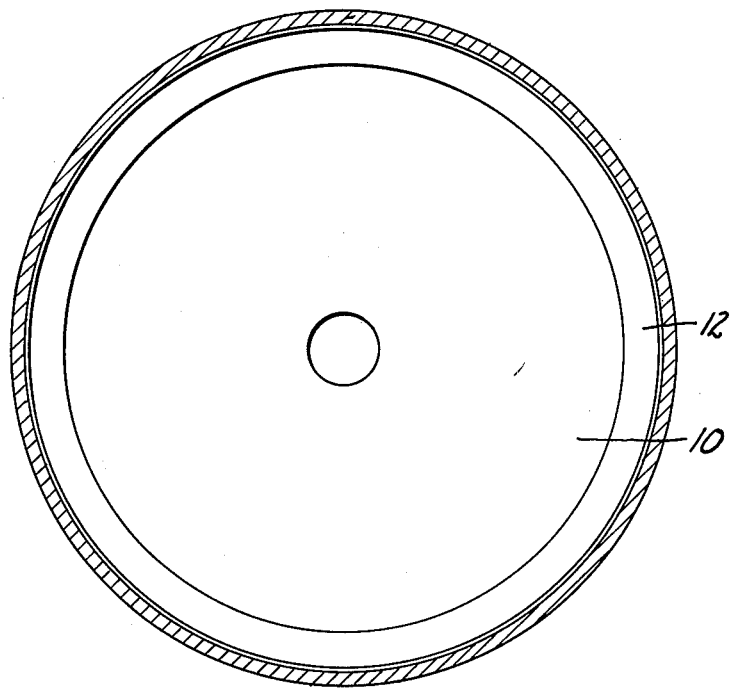
FIGURE 1 is a cross sectional view of a cylinder and piston embodying principles of the present invention.
Figure 2:
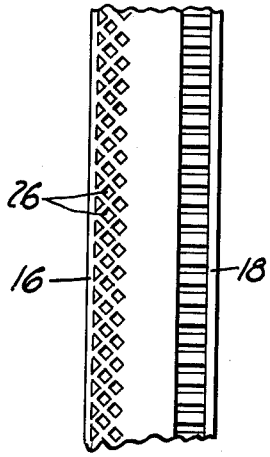
FIGURE 2 is a fragmentary side view of the sealing structure of the piston seen in FIGURE 1.
Figures 3, 4:
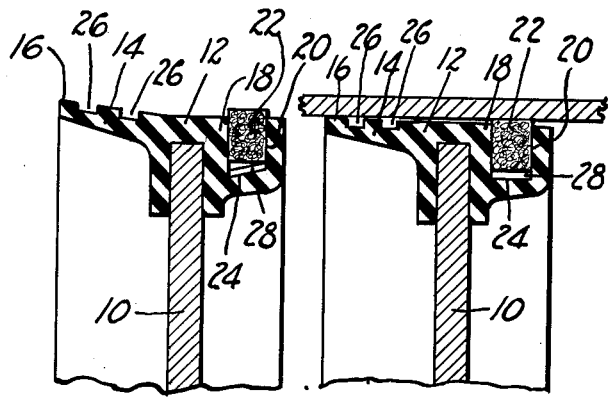
FIGURE 3 is a fragmentary cross sectional view of the sealing structure shown in FIGURE 2 before it is installed in its cooperating cylinder walls.
FIGURE 4 is a fragmentary cross sectional view corresponding to FIGURE 3, but showing a sealing structure in a deformed position wherein it sealingly engages the cylinder walls.

The preferred embodiment of sealing structure shown in the drawing generally comprises a main body portion 12 that surrounds the periphery of the steel plate 10, and a lip portion 14 which extends rearwardly and slightly outwardly from a normal to the rigid piston structure 10, so that its rearwardmost or trailing edge 16 will be biased into sliding sealing engagement with the cooperating cylinder walls. The sealing structure further includes a forwardly extending lip structure 18 having an annular groove 20 in its outer surface into which is embedded a block of resilient absorbent material 22 which in the preferred embodiment shown in the drawing is made from felt. The "as-molded" condition of the forward lip 18 is preferably such that it will resiliently bias the absorbent material 22 outwardly into engagement with the cylinder walls when the piston assembly is installed within its cylinder. As shown in FIGURE 3, the bottom surface 24 of the groove 20 is inclined slightly outwardly; so that when the body of felt material 22 is compressed into the groove 20 until its top surface projects slightly outwardly of the surface lip to engage the surface of the cylinder walls, the forward lip 18 will be deformed until the bottom edge 24 becomes coincident with the felt material 22.

When the piston structure shown in the drawing is operated in a cylinder, such as that shown in the Douglas Patent No. 2,386,668, the portion 12 of the sealing structure which overlies the rigid portion of the piston body will serve to support and generally guide the piston structure throughout its stroke. As previously indicated, the felt material 22 will be biased outwardly into engagement with the cylinder walls by means of the resiliency of the elastomer compound forming the forward lip of the sealing structure, so as to coat the cylinder walls with a lubricant prior to the time that they are engaged by the cylindrical guiding surfaces of the seal. As previously indicated, the rearwardly extending lip 14 is also yieldably biased into engagement with the cylinder walls because of the resiliency of the elastomer compound, so that a sliding seal will at all times be provided between its rearwardmost edge 16 and the cylinder walls which they engage. In the preferred embodiment shown in the drawing, there are provided a plurality of closely spaced, but nevertheless separated, depressions 26 which extend around the surface of the rearward lip 14 and which serve the purpose of accumulating and retaining a supply of the lubricant material that is placed upon cylinder walls by the felt material 22 at a position just forwardly of the sealing portion 16 of the rearward lip 14. It has also been found helpful, although not necessary in all instances, to provide a plurality of transverse depressions 28 in the bottom surface of the groove 20 to help retain lubricant in the top portion of the seal. Where the seals are to be lubricated with a viscous oil, the felt when squeezed in place, looses some of its lubricant to the bottom of the groove 20; and the depressions 28 in the top half of the seal serve to retain some of this oil.

While the preferred embodiment has been described as using a plurality of depressions 26, they may not in all instances be necessary, and it will further be understood that the depressions 28 which are normally preferred may not in all instances be necessary.

While the invention has been described in considerable detail, I do not wish to be limited to the precise configurations shown and described; and it is my intention to cover hereby all novel adaptations, modifications and arrangements thereof which come within the practice of those skilled in the art to which the invention relates.

I claim:

1. A piston for sliding sealing engagement with cylinder walls upon forward relative motion therebetween and comprising: a rigid support member having a generally disc-shaped outer portion to the periphery of which is fixed a flexible sealing structure, said sealing structure having portions lying on the front and rear sides of said disc-shaped portion, the outer surface of the portion lying on the rearward side of said support member being molded at an angle extending outwardly of a normal to said support member, and the portion of said sealing structure lying on the forward side of said support member having a circumferentially extending groove in its outer surface, a resilient absorbent material filling said groove with its outer surface extending outwardly of said forward portion of said sealing structure to engage said cylinder walls for retaining a liquid lubricant compatible with said sealing structure and distributing said liquid lubricant around the periphery of said sealing structure through capillary action, said forward portion of said sealing structure being yieldable to urge said absorbent material into engagement with said cylinder walls.

2. A piston for sliding sealing engagement with cylinder walls upon forward relative motion therebetween and comprising: a rigid support member having a generally disc-shaped outer portion to the periphery of which is bonded a sealing structure of an elastomeric compound, said sealing structure having portions lying on either side of said disc-shaped portion, the outer surface of the portion lying on the rearward side of said support member being molded at an angle extending outwardly of a normal to said support member, the portion of said elastomeric compound positioned radially outwardly of said support member being generally solid, and the portion of said sealing structure lying on the forward side of said support member having a circumferentially extending groove in its outer surface, a resilient absorbent material filling said groove with its outer surface extending outwardly of said forward portion of said sealing structure to engage said cylinder walls for retaining a liquid lubricant compatible with said elastomeric compound and distributing said liquid lubricant around the periphery of said sealing structure through capillary action, said forward portion of said elastomeric compound being yieldable to urge said absorbent material into engagement with said cylinder walls.

3. A piston for sliding sealing engagement with cylinder walls upon forward relative motion therebetween and comprising: a rigid support member having a generally disc-shaped outer portion to the periphery of which is fixed a flexible sealing structure, said sealing structure extending over the periphery of said disc shaped portion and having portions lying on either side of said generally disc-shaped portion, the outer surface of the portion lying on the rearward side of said support member being molded at an angle extending outwardly of a normal to said support member, said angularly outwardly extending surface having a plurality of nonconnected depressions generally evenly spaced around its periphery forwardly of its rearwardmost sealing edge, the portion of said elastomeric compound positioned radially outwardly of said support member being generally solid, and the portion of said sealing structure lying on the forward side of said support member having a circumferentially extending groove in its external surface, a resilient absorbent material filling said groove with its outer surface extending outwardly of said forward portion of said sealing structure to engage said cylinder walls for retaining a liquid lubricant compatible with said elastomeric compound and distributing said liquid lubricant around the periphery of said sealing structure through capillary action, said forward portion of said elastomeric compound being yieldable to urge said absorbent material into engagement with said cylinder walls.

4. A piston for sliding sealing engagement with cylinder walls and comprising: a rigid support member having a generally disc-shaped outer portion to the periphery of which is bonded an elastomeric material sealing structure, said sealing structure extending over the periphery of said disc shaped portion and having portions lying on either side of said disc-shaped portion, the outer surface of the portion lying on the rearward side of said support member being molded at an angle extending outwardly of a normal to said support member, said angularly outwardly extending surface having a plurality of nonconnected depressions generally evenly spaced around its periphery forwardly of its rearwardmost sealing edge, the portion of said sealing structure positioned radially outwardly of said support member being generally solid, and the portion of said sealing structure lying on the forward side of said support member having a groove therein, a resilient absorbent material filling said groove with its outer surface extending outwardly of said forward portion of said sealing structure to engage said cylinder walls for retaining a liquid lubricant compatible with said sealing structure and distributing said liquid lubricant around the periphery of said sealing structure through capillary action, said forward portion of said sealing structure being yieldable to urge said absorbent material into engagement with said cylinder walls.

References Cited in the file of this patent

UNITED STATES PATENTS

| 713,964 | Clark | Nov. 18, 1902 |
| 1,273,738 | Christenson | July 23, 1918 |
| 2,489,715 | Mark et al. | Nov. 29, 1949 |
| 2,777,741 | Vielmo | Jan. 15, 1957 |

FOREIGN PATENTS

| 643,102 | Great Britain | Sept. 15, 1950 |